(12) United States Patent
Watanabe et al.

(10) Patent No.: US 11,148,566 B2
(45) Date of Patent: Oct. 19, 2021

(54) VEHICLE SEAT

(71) Applicant: TOYOTA BOSHOKU KABUSHIKI KAISHA, Aichi-ken (JP)

(72) Inventors: Shunsuke Watanabe, Aichi-ken (JP); Akie Nishiguchi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 5 days.

(21) Appl. No.: 16/901,491

(22) Filed: Jun. 15, 2020

(65) Prior Publication Data

US 2020/0398718 A1     Dec. 24, 2020

(30) Foreign Application Priority Data

Jun. 19, 2019   (JP) .............................. JP2019-113871

(51) Int. Cl.
*B60N 2/68*     (2006.01)
*B60R 22/26*    (2006.01)
*B60R 22/18*    (2006.01)

(52) U.S. Cl.
CPC .............. *B60N 2/688* (2013.01); *B60R 22/26* (2013.01); *B60R 2022/1806* (2013.01); *B60R 2022/266* (2013.01)

(58) Field of Classification Search
CPC ................................ B60N 2/688; B60R 22/26
See application file for complete search history.

(56) References Cited

U.S. PATENT DOCUMENTS

| 9,045,105 B2 * | 6/2015 | Khaitan | B60R 22/18 |
| 2015/0343991 A1 * | 12/2015 | Brodd | B60R 22/26 |
| | | | 297/452.18 |
| 2019/0351796 A1 * | 11/2019 | Yang | B60N 2/688 |

FOREIGN PATENT DOCUMENTS

| JP | H06-059173 |   | 8/1994 |   |
| JP | 10129412 A | * | 5/1998 |   |
| JP | 2010064639 A | * | 3/2010 |   |
| JP | 6812228 B2 | * | 1/2021 | ............. B60R 22/26 |

* cited by examiner

*Primary Examiner* — Anthony D Barfield
(74) *Attorney, Agent, or Firm* — Greenblum & Bernstein P.L.C.

(57) ABSTRACT

A vehicle seat includes a seat pad, an insertion hole that passes through the seat pad, a covering portion that covers an inner wall of the insertion hole, a holding plate that holds a distal end of the covering portion, a buckle for a seat belt, and a support plate. In the vehicle seat, the buckle includes a buckle main body, a coupling portion, and an attachment member. The support plate is displaceable between a first state and a second state, the holding plate includes an insertion window portion, and the support plate includes a passage portion that allows the coupling portion to pass through the passage portion but does not allow the buckle main body to pass through the passage portion in a state where the support plate overlaps with the insertion window portion.

11 Claims, 12 Drawing Sheets

VEHICLE SEAT

CROSS REFERENCE TO RELATED APPLICATIONS

This application is based on Japanese Patent Applications No. 2019-113871 filed on Jun. 19, 2020, the entire contents of which are incorporated herein by reference.

TECHNICAL FIELD

The present invention relates to a vehicle seat including a buckle for a seat belt disposed in an insertion hole of a seat pad, a covering portion that covers an inner wall of the insertion hole, and a holding plate that holds a distal end of the covering portion on the back side of the seat pad.

BACKGROUND ART

In this type of vehicle seat, a buckle for a seat belt is provided, and the main body portion of the buckle is disposed in an insertion hole (through hole) of a seat pad that elastically supports an occupant. The inner wall of the insertion hole is covered with a covering portion, and an end portion of the covering portion is held by a plate-shaped holding plate disposed on the back side of the seat pad. For example, in a seat with a seat belt disclosed in JP-U-06-59173, a through hole corresponding to an insertion hole of the present invention is provided in a pad member of a seat cushion, and a buckle is disposed in the through hole. The buckle includes a substantially cubic buckle main body and a belt-shaped seat belt coupled to a lower side of the buckle main body. The inner wall of the through hole is covered with a distal end of a trim cover corresponding to the covering portion of the present invention, and the distal end of the trim cover is held by a locking plate disposed on the back side of the seat pad. The locking plate is a flat plate member corresponding to the holding plate of the present invention, and is provided with a slit that allows the seat belt to pass therethrough but does not allow the buckle main body to pass therethrough. Therefore, it is possible to prevent the buckle main body from detaching from the through hole by disposing the locking plate so as to overlap with the through hole while being disposed on the back surface of the seat pad.

Incidentally, various attachment members may be attached to the above-described buckle, and examples of such attachment members include fastening members such as brackets and bolt members, and electrical components such as cables. When the buckle is disposed, the buckle main body and the attachment member are inserted into the insertion hole from either the seating side or the back side in consideration of the disposing position of the attachment member and the like, and are extracted from the insertion hole as necessary. However, in the technique of JP-U-06-59173, the slit of the locking plate (holding plate) is narrowed from the viewpoint of preventing the buckle main body from detaching. For this reason, in the technique of JP-U-06-59173, the buckle main body and the attachment member cannot pass through the slit, there is a possibility that the workability at the time of disposing the buckle cannot be ensured, for example, due to the time required for the insertion work or pull-out work into the insertion hole or the like. The present invention has been made in view of the above circumstances, and an object to be solved by the present invention is to support the buckle main body in the insertion hole with good performance while enabling smooth insertion and pull-out of the buckle with respect to the insertion hole.

As means for solving the above problems, a vehicle seat of a first aspect of the invention includes: a seat pad capable of elastically supporting an occupant; an insertion hole passing through the seat pad in the thickness direction; a planar covering portion that covers an inner wall of the insertion hole; a holding plate that holds a distal end of the covering portion on the back side of the seat pad; and a buckle for the seat belt. Then, the buckle includes a buckle main body disposed in the insertion hole, a coupling portion integrally formed with the buckle main body and having an outer dimension smaller than that of the buckle main body, and an attachment member provided on the buckle main body or the coupling portion. In this type of configuration, it is desired to support the buckle main body in the insertion hole with good performance while enabling smooth insertion and pull-out of the buckle with respect to the insertion hole.

SUMMARY

Thus, the vehicle seat of the present invention includes a support plate separate from the holding plate, and the support plate is displaceable between a first state overlapping the holding plate on the back surface side of the seat pad and a second state not overlapping the holding plate. The holding plate includes an insertion window portion that allows insertion of the buckle in a state overlapping the insertion hole, and the support plate includes a passage portion that allows passage of the coupling portion but does not allow passage of the buckle main body in a state overlapping the insertion window portion.

In the present invention, by setting the support plate in the first state, the buckle main body can be supported so as not to be detached from the insertion hole while the coupling portion is inserted through the relatively small passage portion. When the support plate is in the second state, the buckle (for example, the buckle main body or the attachment member) can be inserted into or pulled out from the insertion hole through the relatively large insertion window portion of the holding plate.

The vehicle seat of a second aspect of the present invention according to the first aspect of the present invention, in which the buckle main body includes a cord-shaped cable as an attachment member, and the cable can be routed to the back side of the seat pad through the insertion window portion and the passage portion. In the present invention, since the cable which is the attachment member of the buckle main body can be routed to the back side of the seat pad through the insertion window portion and the passage portion, the workability at the time of disposing the buckle can be ensured more reliably.

The vehicle seat of a third aspect of the invention is a vehicle seat according to the first or second aspect of the present invention, and further including a seat cover that covers an outer surface of the seat pad, in which the covering portion is integrated with a seat cover portion covering a seating surface of the seat pad and the support plate is attached to a seat cover portion disposed on the back surface side of the seat pad. In the present invention, the covering portion and the support plate can be disposed at appropriate positions by using the seat cover.

The vehicle seat of a fourth aspect of the present invention according to the third aspect of the present invention, in which the support plate is attached to an edge end portion of the seat cover. In the present invention, the edge end portion of the seat cover can be stably disposed on the back side of the seat pad through the support plate, which contributes to improvement in the finishability of the seat cover.

The vehicle seat of the fifth aspect according to any one of the first to fourth aspects of the present invention, further including an engagement structure for engaging the support plate in the first state with the holding plate, in which the engagement structure is formed by a convex portion provided on one of the holding plate and the support plate and a hole portion provided on the other opposite to the one and into which the convex portion is inserted and engaged. According to the present invention, the support plate can be stably overlapped with the holding plate by the engagement structure, which contributes to ensuring the support of the buckle main body.

The vehicle seat of a sixth aspect of the present invention according to the fifth aspect of the present invention, in which one of the holding plate and the support plate is a resin molded article integrally provided with a convex portion. In the present invention, by integrating the convex portion with the corresponding plate, the number of parts of the vehicle seat can be reduced, which improves workability at the time of disposing each plate.

The vehicle seat of a seventh aspect of the present invention according to any one of the first to sixth aspects of the present invention, in which the support plate in the first state is inserted and interposed between the seat pad and the holding plate. In the present invention, the support plate in the first state is stably disposed in a state of being sandwiched between the seat pad and the holding plate.

The vehicle seat of an eighth aspect of the present invention according to the seventh aspect of the present invention, in which the passage portion is a notched-shaped groove portion provided in the support plate and includes an opening portion at an edge end side of the support plate in an insertion direction of the support plate, and the opening dimension of the opening portion gradually increases toward the edge end of the support plate. In the present invention, the insertion work of the support plate can be performed smoothly by increasing the opening dimension of the passage portion on an opening portion side.

The vehicle seat of a ninth aspect of the present invention according to the seventh or eighth aspect of the present invention, in which the covering portion includes a first covering piece and a second covering piece which are disposed to face each other in a direction orthogonal to the insertion direction of the support plate. Then, the first covering piece and the second covering piece are held by the holding plate in a state in which extra length portions are provided so as to allow insertion of the support plate, in addition to portions covering the corresponding inner walls. In the present invention, the insertion work of the support plate can be performed more smoothly by providing specific covering pieces with slack due to the extra length portions.

The vehicle seat of a tenth aspect of the present invention according to any one of the seventh to ninth aspects of the present invention, in which the covering portion includes a third covering piece and a fourth covering piece which are disposed to face each other in the insertion direction of the support plate. Then, the third covering piece and the fourth covering piece are held by the holding plate in a state in which extra length portions corresponding to the thickness dimension of the support plate are provided, in addition to portions covering the corresponding inner walls. In the present invention, the specific covering piece is held by the holding plate in a state of having a predetermined extra length portion in consideration of the interposition of the support plate. Therefore, even when the support plate is overlapped with the holding plate, a situation in which the buckle main body in the insertion hole protrudes excessively toward the seating side can be avoided as much as possible due to the thickness of the support plate.

Advantageous Effects of Invention

According to the first aspect of the present invention, the buckle main body in the insertion hole can be supported with good performance while enabling smooth insertion and pull-out of the buckle with respect to the insertion hole. According to the second aspect of the invention, workability at the time of disposing the buckle can be ensured more reliably. According to the third aspect of the invention, both the attachment property of the covering portion and the workability at the time of disposing the buckle can be more reliably achieved by using the seat cover. According to the fourth aspect of the invention, the finishability of the seat cover can be further ensured while the workability at the time of disposing the buckle can be further ensured. According to the fifth aspect of the present invention, the buckle main body in the insertion hole can be more reliably supported. According to the sixth aspect of the present invention, the buckle main body in the insertion hole can be more reliably supported by a relatively simple configuration. According to the seventh aspect of the invention, the buckle main body in the insertion hole can be further reliably supported. According to the eighth aspect of the invention, the buckle main body in the insertion hole can be reliably supported while ensuring smooth insertion of the support plate. According to the ninth aspect of the present invention, the buckle main body in the insertion hole can be further reliably supported while ensuring more smooth insertion of the support plate. According to the tenth aspect, the buckle main body in the insertion hole can be supported with good appearance.

DESCRIPTION OF EMBODIMENTS

Figure 7:
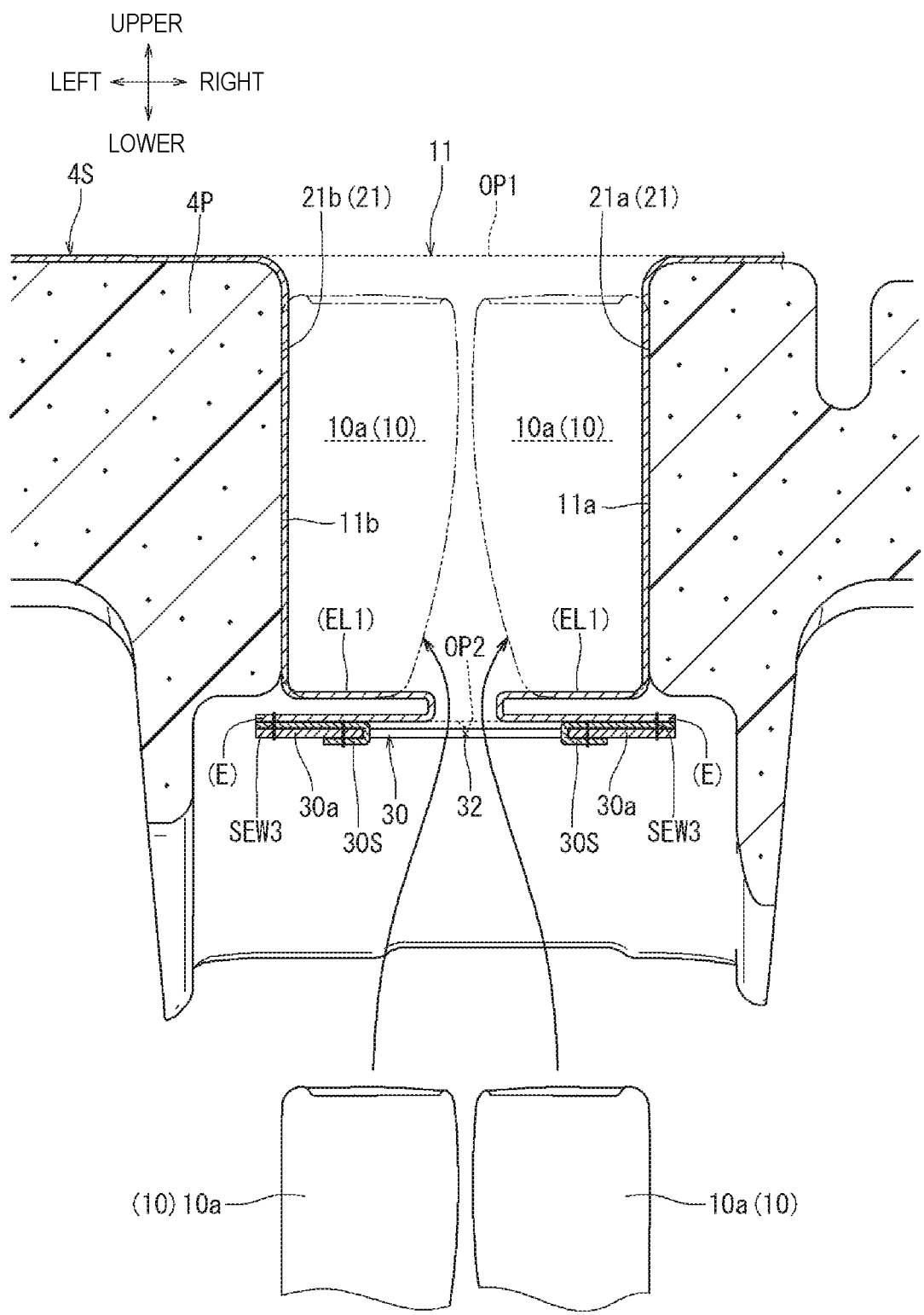
FIG. 7 is a cross-sectional view of the seat cushion in a state in which the holding plate is disposed.
Figure 8:
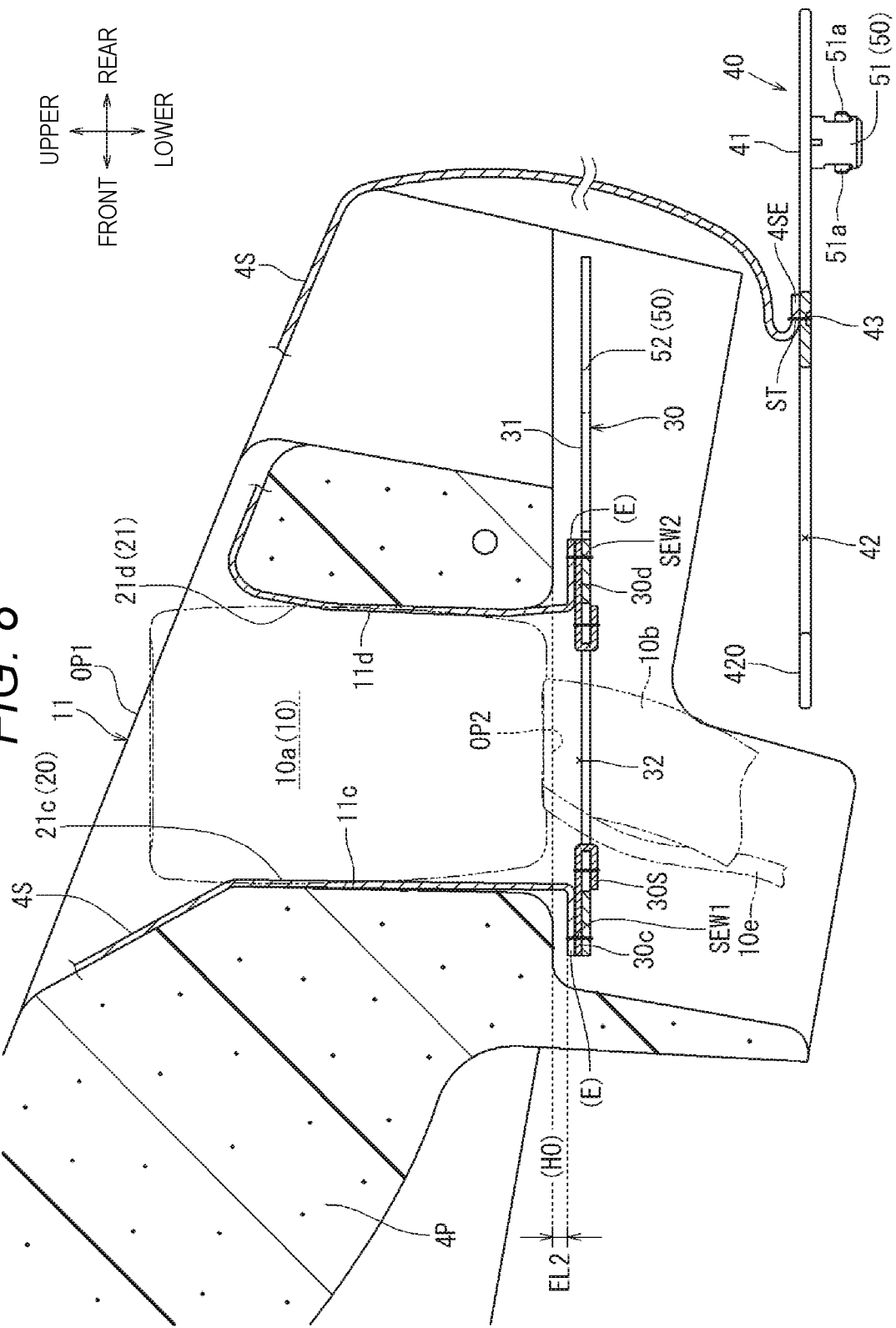
FIG. 8 is a longitudinal-sectional view of the seat cushion in a state in which the holding plate is disposed.
Figure 11:
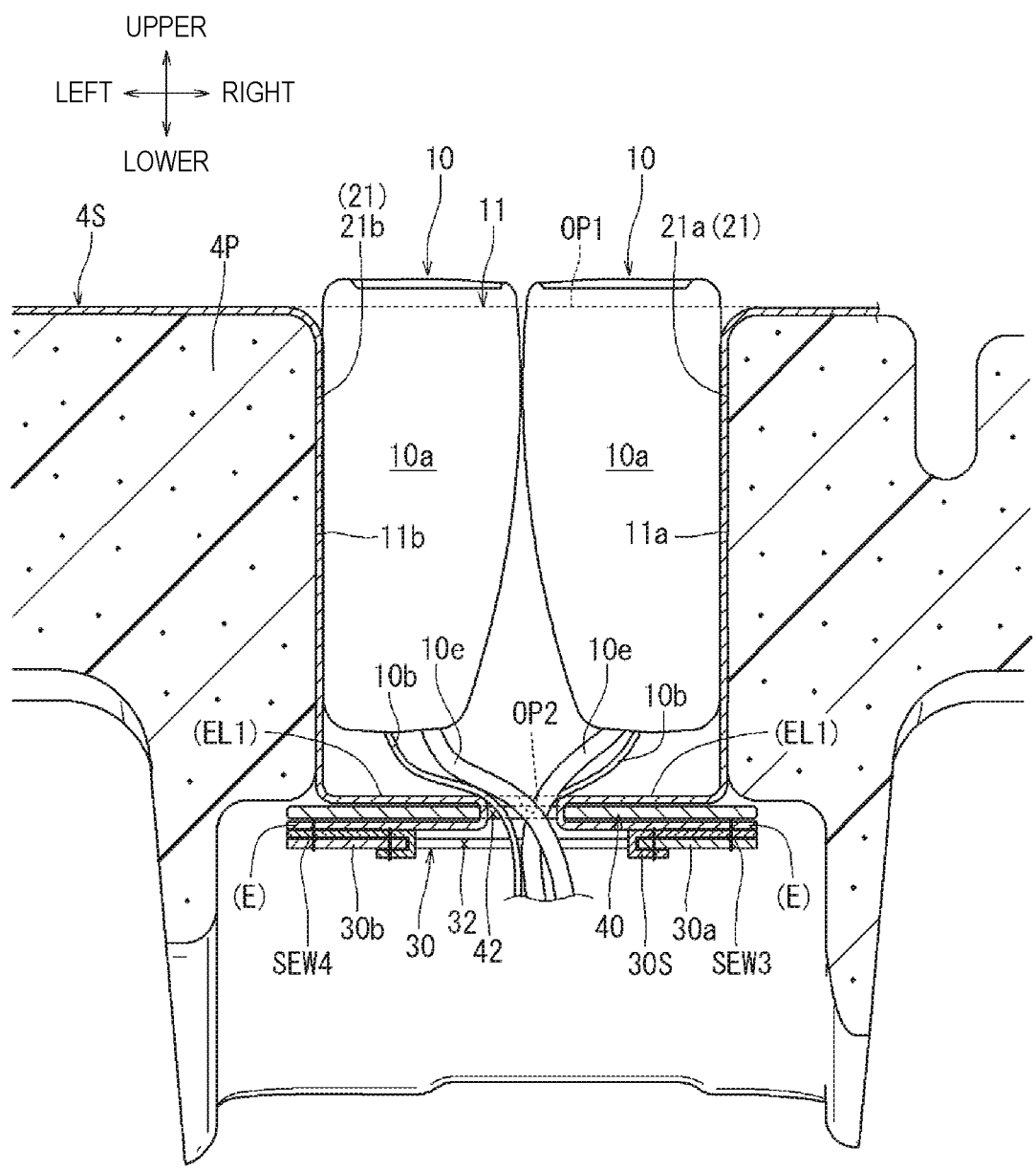
FIG. 11 is a cross-sectional view of the seat cushion in a state in which the support plate is disposed.
Figure 12:
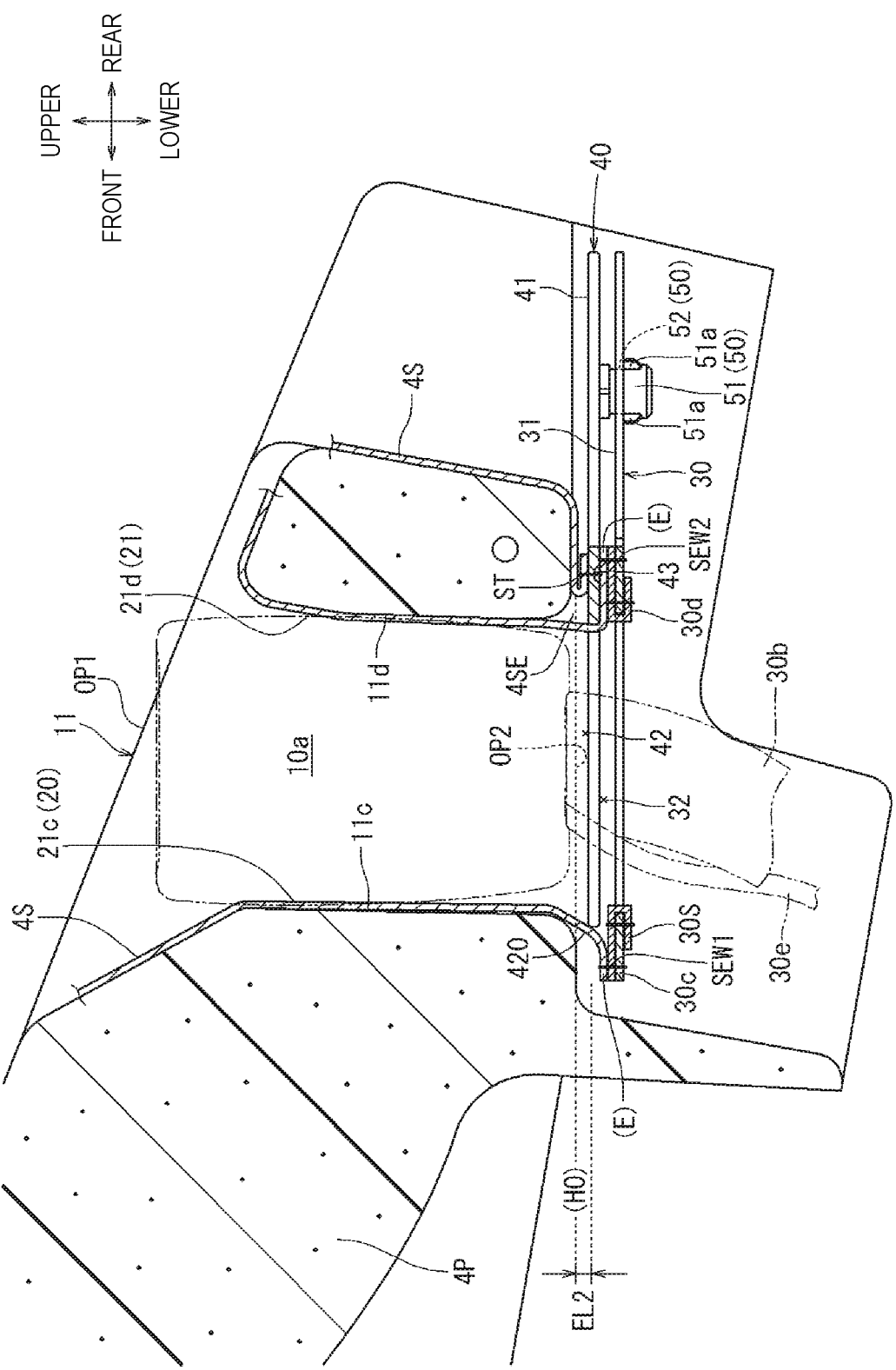
FIG. 12 is a longitudinal-sectional view of the seat cushion in a state in which the support plate is disposed.

Hereinafter, embodiments of the present invention will be described with reference to FIGS. 1 to 13. In the drawings, arrows indicating a front-rear direction, a left-right direction, and an upper-lower direction of a vehicle seat are appropriately shown for convenience. In FIGS. 3 to 6, arrows indicating a front-rear direction, a left-right direction, and an upper-lower direction of each of the plates are appropriately shown with reference to a state in which each plate is disposed on the vehicle seat. In FIGS. 8 and 12, the buckle is shown by a two-dot chain line for convenience, and in FIGS. 10 and 13, only one buckle is shown for convenience.

Figure 1:
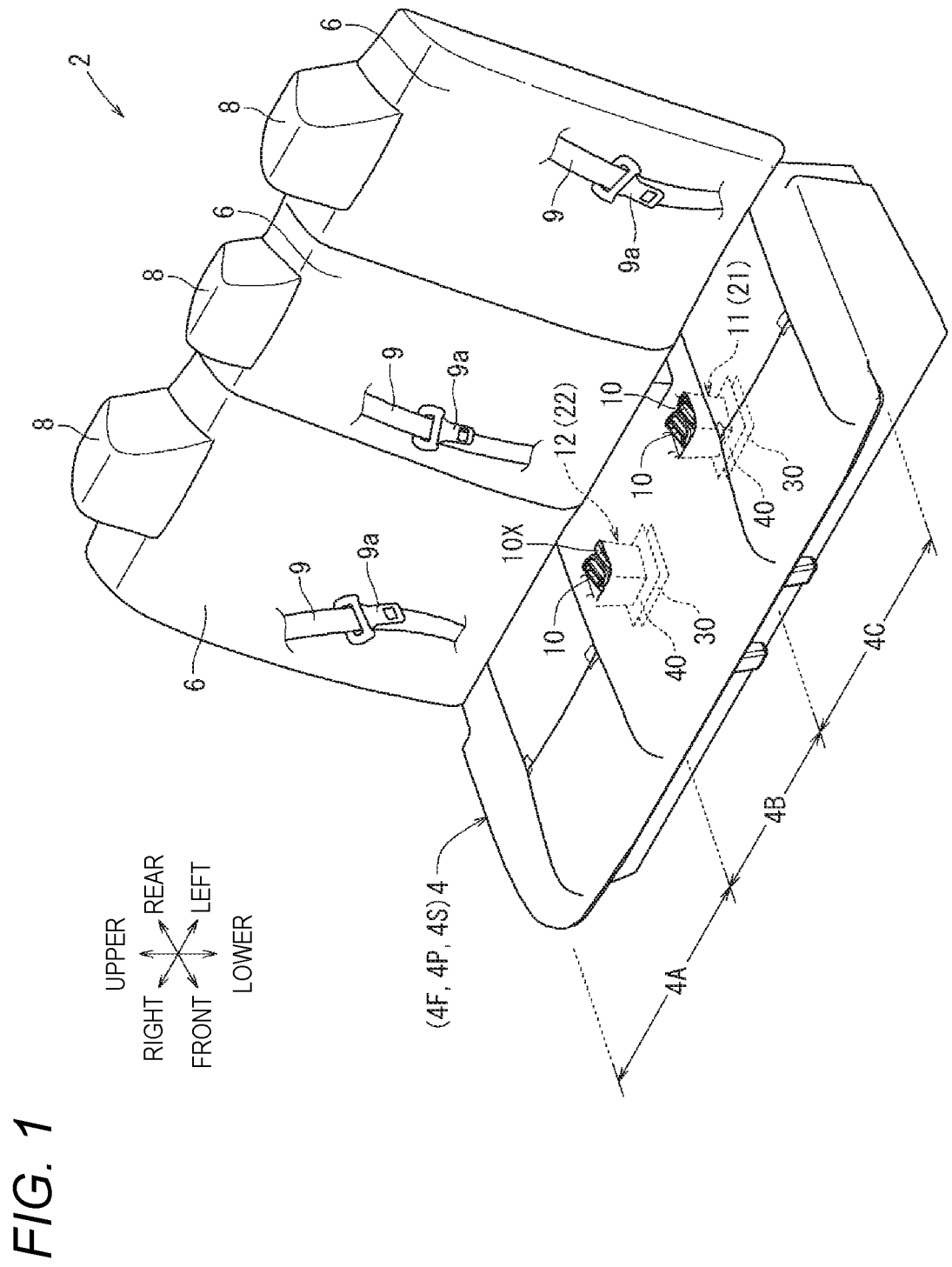
FIG. 1 is a perspective view of a vehicle seat.

A vehicle seat 2 shown in FIG. 1 is an interior component disposed in a vehicle interior, and includes a seat cushion 4, a plurality of seat backs 6, a plurality of headrest 8, and a plurality of seat belts 9 (in FIG. 1, for convenience, each seat back is denoted by a common reference numeral 6, and each headrest is denoted by a common reference numeral 8). A lower portion of each seat back 6 in an upright state is tiltably connected to a rear portion of the seat cushion 4 (described later in detail), and the headrest 8 is disposed at an upper portion of each seat back 6. Each seat belt 9 is a belt-shaped member capable of restraining an occupant seated on the seat cushion 4, and tongues 9a which can be locked to the seat cushion 4 side are respectively attached to the middle of the seat cushion 4 in a length direction thereof (for convenience, a common reference numeral 9 is attached to each seat belt and only a part thereof is shown in FIG. 1).

[Seat Cushion]

The seat cushion 4 shown in FIG. 1 has a rectangular shape elongated in the left-right direction, which is the seat width direction, and is divided into a right-side seat portion 4A on the right side, a central seat portion 4B at the center, and a left-side seat portion 4C on the left side. The seat cushion 4 includes a seat frame 4F, a seat pad 4P, and a seat cover 4S as a basic configuration, and a pair of left and right insertion holes 11, 12 (described in detail below) are provided in a central rear portion thereof. As will be described later, each insertion hole 11 (12) is provided with a covering portion 21 (22), a holding plate 30, and a support plate 40.

Each of the insertion holes 11, 12 shown in FIG. 1 is provided with a plurality of buckles 10 (10X) for the seat belt. Each of the buckles 10 (10X) is formed of a plurality of members 10a to 10e, which will be described later with reference to FIGS. 1 and 2 (in FIG. 1, for convenience, a small buckle is denoted by a specific reference numeral 10X, and other buckles of the same dimension are denoted by a common reference numeral 10a). In the present embodiment, the respective buckles 10 (10X) are inserted into or pulled out from the corresponding insertion holes 11, 12 in consideration of the disposing positions of the attachment members (10c to 10e) to be described later. In this type of configuration, it is necessary to take care that the main body portion (the buckle main body 10a) of each buckle after disposition is not detached from each insertion hole 11, 12 while ensuring the workability at the time of disposing each buckle 10 (10X). Therefore, in the present embodiment, the buckle main body 10a in each of the insertion holes 11, 12 is supported with good performance while enabling smooth insertion and pull-out of the buckle 10 (10X) with respect to each of the insertion holes 11, 12 by a configuration described later (such as the support plate 40). Hereinafter, configurations will be described in detail.

[Buckle]

Each buckle 10 (10X) shown in FIG. 1 has substantially the same basic configuration except that the outer dimensions are different. Therefore, the details of one buckle 10 disposed in the left insertion hole 11 to be described later will be described below as an example. The buckle 10 shown in FIG. 2 includes a buckle main body 10a, a coupling portion 10b, and a plurality of attachment members (a bracket 10c and a fastener 10d, a cable 10e). The buckle main body 10a is a cubic member capable of locking the tongue, and has an outer dimension that can be disposed on the left side of the left insertion hole 11 in a vertically placed state. The coupling portion 10b is a planar band member connected to and integrated with the lower surface of the buckle main body 10a, and is a member for coupling the buckle main body 10a to an appropriate position in the vehicle interior. The coupling portion 10b is formed of a material such as cloth or leather having appropriate flexibility, and has a length dimension capable of reaching the vehicle floor surface from the left insertion hole 11 in a disposed state to be described later. The outer dimension of the coupling portion 10b is smaller than that of the lower surface of the buckle main body 10a, and the outer dimension of the coupling portion 10b is defined by the front-rear width dimension and the left-right thickness dimension.

[Attachment Member]

Figure 2:
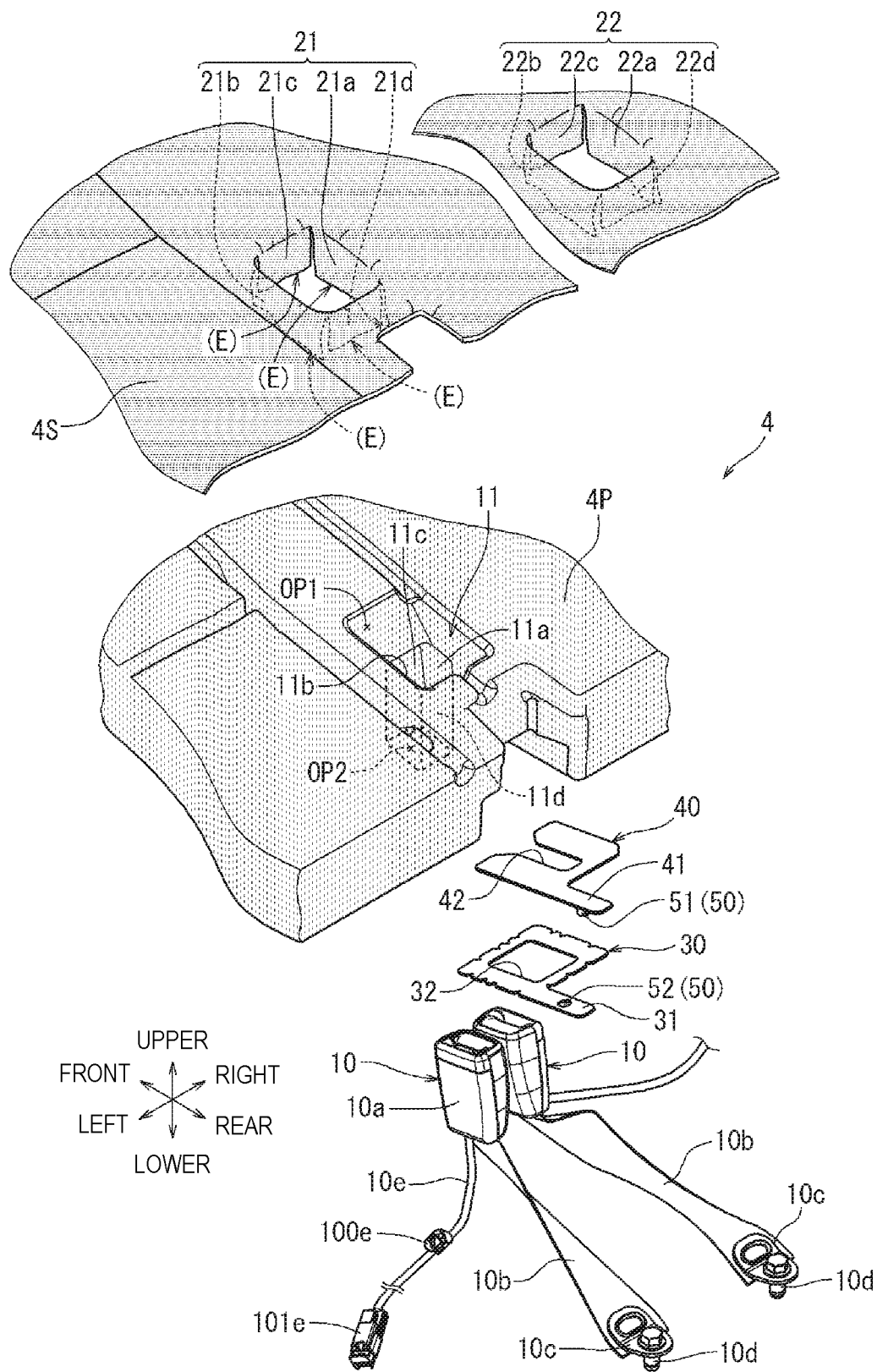
FIG. 2 is an exploded perspective view of a portion of a seat cushion.

A plurality of attachment members or a single attachment member can be appropriately attached to the buckle main body 10a and the coupling portion 10b shown in FIG. 2. For example, in the present embodiment, a plate-shaped bracket 10c that can be fastened to the vehicle floor surface side is attached as an attachment member to a distal end on the lower side of the coupling portion 10b, and a bolt-shaped fastener 10d is inserted through the bracket 10c. A cable 10e, which is an attachment member, is connected to the lower surface of the buckle main body 10a. The cable 10e is a cord-shaped electrical component having a predetermined length, and a clip 100e is inserted in the middle of the cable 10e in the longitudinal direction. The cable 10e is routed on the back side of the seat pad 4P as will be described later, and is electrically connected to a power supply or other cables (not shown) at a connection portion 101e at the distal end of the cable 10e.

[Seat Frame and Seat Cover]

The seat cushion 4 shown in FIGS. 1 and 2 is formed by disposing the seat pad 4P on the seat frame 4F (not shown) and covering an outer surface of the seat pad 4P with the seat cover 4S. The seat frame 4F is a frame body having a substantially rectangular shape in a top view, and is formed of a metal or a hard resin having excellent rigidity. The seat cover 4S is a surface member constituting a design surface of a sheet, and is formed of cloth (woven fabric, knitted fabric, non-woven fabric) made of natural fibers or synthetic fibers or leather (natural leather, synthetic leather). The seat cover 4S covers a portion from the seating surface to a back surface of the seat pad 4P to be described later. Each of the covering portions 21, 22 to be described later is integrated with the seat cover 4S on the seating side. Referring to FIG. 8, a lower portion of the rear portion of the seat cover 4S is disposed on the back side of the seat pad 4P to be described later, and the support plate 40 to be described later can be attached thereto.

[Seat Pad]

Referring to FIGS. 1 and 2, the seat pad 4P is a member having a substantially rectangular shape in a top view capable of elastically supporting an occupant without a seat external shape, and is formed by a foamed resin such as a polyurethane foam (density: 10 kg/m3 to 60 kg/m$^3$). The seat pad 4P is formed to have a generally rectangular shape in a top view, and forms an external shape of the right-side seat portion 4A, the central seat portion 4B, and the left-side seat portion 4C. In the seat pad 4P, the left insertion hole 11 is provided at a position corresponding to the left side of the rear portion of the central seat portion 4B, and the right insertion hole 12 is provided at a position corresponding to the right side of the rear portion of the central seat portion 4B.

[Insertion Hole]

The left insertion hole 11 and the right insertion hole 12 shown in FIG. 1 are through holes passing through the seat pad 4P in the thickness direction, and have substantially the same basic configuration except for the left-right dimensions. For example, when the left insertion hole 11 shown in FIG. 2 is described in detail as an example, the left insertion hole 11 is a substantially rectangular parallelepiped through hole having a relatively large dimension, and is formed in a rectangular shape that is long in the left-right direction in a top view. The opening dimension of the left insertion hole 11 is such that two buckle main bodies 10a having substantially the same dimension can be disposed side by side in the left-right direction. The depth (upper-lower) dimension of the left insertion hole 11 is defined by the distance between an upper opening OP1 on the seating side and an lower opening OP2 on the back side opposite to the seating side, and is set such that the buckle main body 10a does not protrude. As shown in FIGS. 7 and 8, inside the left insertion hole 11, a right inner wall 11a on the right side and a left inner wall 11b on the left side are disposed to face each other, and a front inner wall 11c and a rear inner wall 11d on the front side face each other. The right insertion hole 12 shown in FIG. 1 is formed in a rectangular shape that is relatively short in the left-right direction in a top view, and the buckle main body 10a and a buckle main body (not shown) of another buckle 10X that is smaller than the buckle main body 10a can be disposed side by side in the left-right direction.

[Covering Portion]

Figure 6:
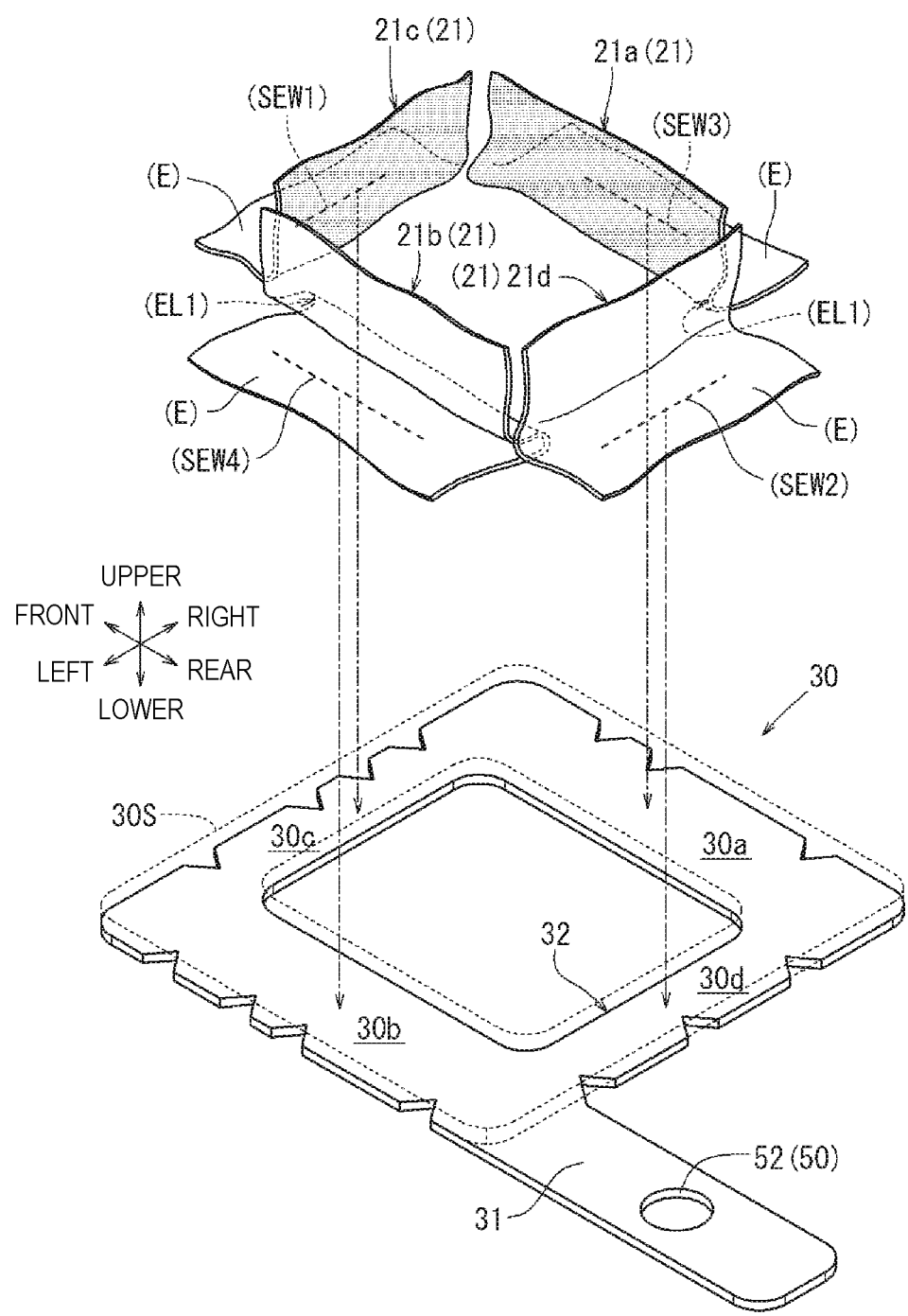
FIG. 6 is a perspective view of a covering portion and the holding plate.

Referring to FIGS. 1 and 2, the inner walls 11a to 11d of the left insertion hole 11 are covered with the first covering portion 21, and the inner walls (not shown) of the right insertion hole 12 are covered with the second covering portion 22. Here, since the first covering portion 21 and the second covering portion 22 have substantially the same basic configuration, the first covering portion 21 will be described in detail as an example. The first covering portion 21 shown in FIGS. 2 and 6 is a substantially square tubular-shaped surface member that follows the inner shape of the left insertion hole 11, and includes a right-side covering piece 21a, a left-side covering piece 21b, a front-side cover piece 21c, and a rear-side covering piece 21d, as will be described later. Although the material of the first covering portion 21 is not particularly limited, it is desirable to use the same material as the seat cover 4S in consideration of the appearance of the seat. The second covering portion 22 shown in FIG. 2 is also a substantially square tubular-shaped surface member covering the inner walls of the right insertion hole 12. The second covering portion 22 also includes another right-side covering piece 22a, another left-side covering piece 22b, another front-side covering piece 22c, and another rear-side covering piece 22d.

[First Covering Piece and Second Covering Piece]

In the present embodiment, the right-side covering piece 21a and the left-side covering piece 21b shown in FIGS. 2 and 6 correspond to the first covering piece and the second covering piece of the present invention, and are disposed to face each other in the left-right direction orthogonal to the insertion direction of the support plate 40 to be described later. That is, the right-side covering piece 21a is a portion that covers the right inner wall 11a of the left insertion hole 11, and the left-side covering piece 21h is a portion that covers the left inner wall 11b of the left insertion hole 11. Each of the right-side covering piece 21a and the left-side covering piece 21b is formed in a belt shape extending in the upper-lower direction, has a length dimension capable of being pulled out to the back side of the seat pad 4P, and further has a portion covering the corresponding inner wall and an appropriate extra length portion EL1. An upper end portion, which is an end portion of each of the left-side and right-side covering pieces 21a, 21b on the seating side, is partially integrated with the seat cover 4S that covers the seating surface of the seat pad 4P. A lower end portion E, which is an end portion of the back side of each of the covering pieces 21a, 21b, is not attached to the seat cover 4S and is in a free state.

[Third Covering Piece and Fourth Covering Piece]

In the present embodiment, the front-side covering piece 21c and the rear-side covering piece 21d shown in FIGS. 2 and 6 correspond to the third and fourth covering pieces of the present invention, and are disposed to face each other in the front-rear direction, which is the insertion direction of the support plate 40 to be described later. That is, the front-side covering piece 21c is a portion that covers the front inner wall 11c of the left insertion hole 11, and the rear-side covering piece 21d is a portion that covers the rear inner wall 11d of the left insertion hole 11. Each of the right-side covering piece 21a and the left-side covering piece 21b is formed in a belt shape extending in the upper-lower direction and has a length dimension capable of being pulled out to the back side of the seat pad 4P, but each of them is shorter than each of the left-side and right-side covering pieces 21a, 21b (extra length portions of the front-side covering piece 21c and the rear-side covering piece 21d will be described later). The upper end portion of each of the front-side and rear-side covering pieces 21c, 21d is partially integrated with the seat cover 4S covering the seating surface, and the lower end portion E of each of the covering pieces 21c, 21d is not attached to the seat cover 4S and is in a free state.

[Holding Plate]

Figure 3:
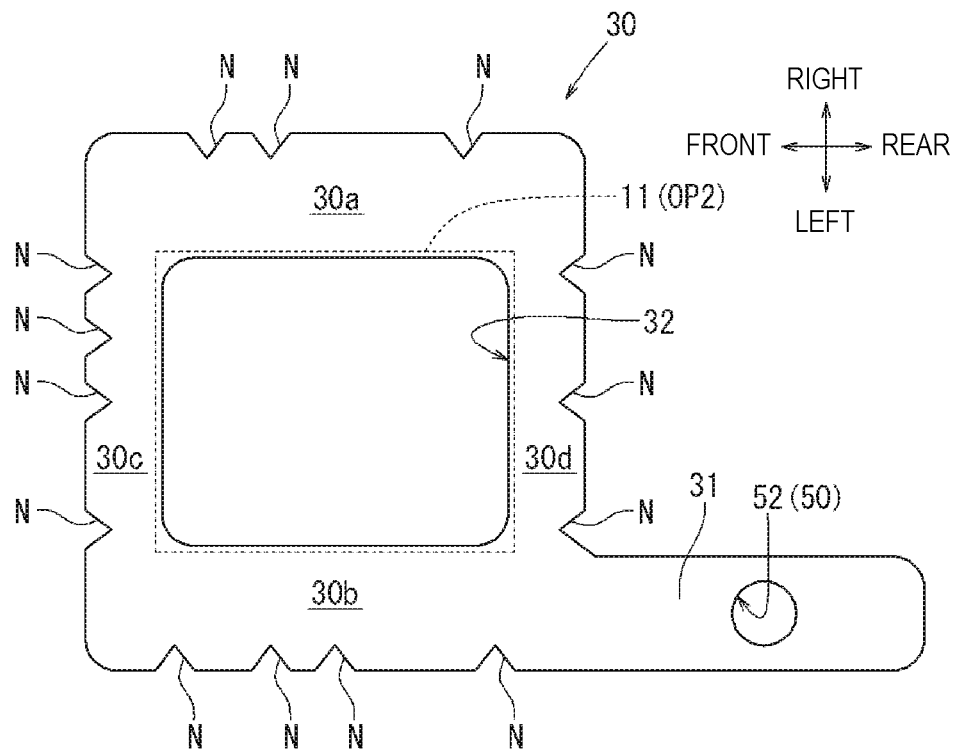
FIG. 3 is a top view of a holding plate.

The holding plates 30 shown in FIG. 1 are members which hold end portions of the corresponding covering portions 21, 22 on the back sides, and have substantially the same basic configuration (in FIG. 1, for convenience, the same reference numeral 30 is attached to each holding plate). For example, when the holding plate 30 on the left insertion hole 11 side shown in FIGS. 2 and 3 is described in detail as an example, the holding plate 30 includes an insertion window portion 32 and a portion of an engagement structure 50 to be described later. The holding plate 3C) is formed in a flat plate shape having a substantially rectangular shape in a top view, and a holding side arm portion 31 extending rearward is integrally provided on the right rear edge side thereof. The outer dimension of the holding plate 30 is larger than that of the lower opening OP2 of the left insertion hole 11. Therefore, at the time of disposition on the seat pad 4P to be described later, peripheral edges right peripheral edge 30a, a left peripheral edge 30b, a front peripheral edge 30c, and a rear peripheral edge 30d) of the holding plate 30 shown in FIG. 3 is disposed so as to be hooked to the peripheral edge of the lower opening OP2 as shown in FIGS. 7 and 8. A plurality of notches N cut out in a triangular shape are provided at appropriate positions on the respective peripheral edges 30a to 30d of the holding plate 30, and the end portion (E) on the back side of the first covering portion 21 shown in FIG. 2 can be positioned and attached with each notch N as a mark. The material of the holding plate 30 is not particularly limited as long as the material has appropriate rigidity, and the holding plate can be typically formed of a metal, a resin (including an elastomer) or the like, and is formed of a solid resin in the present embodiment. An outer surface side of the holding plate 30 of the present embodiment is covered with a planar covering member 30S. As this type of the covering member 30S, the material exemplified in the seat cover can be used.

[Insertion Window Portion]

The insertion window portion 32 shown in FIGS. 2 and 3 is a hole passing through the holding plate 30 in the thickness direction, and can be overlapped with and disposed on the lower side of the left insertion hole 11 at the time of disposing to the seat pad 4P to be described later.

The insertion window portion 32 has an opening dimension through which the buckle main body 10a, the coupling portion 10b, and the attachment members 10c to 10e can be inserted, and is formed substantially at the center of the holding plate 30. For example, the insertion window portion 32 of the present embodiment is formed in a substantially rectangular shape following the lower opening OP2 of the left insertion hole 11, and has an opening dimension that is substantially the same as or slightly smaller than that of the lower opening OP2. Corresponding peripheral edges 30a to 30d of the holding plate 30 are disposed around the insertion window portion 32.

[Support Plate]

Figure 4:
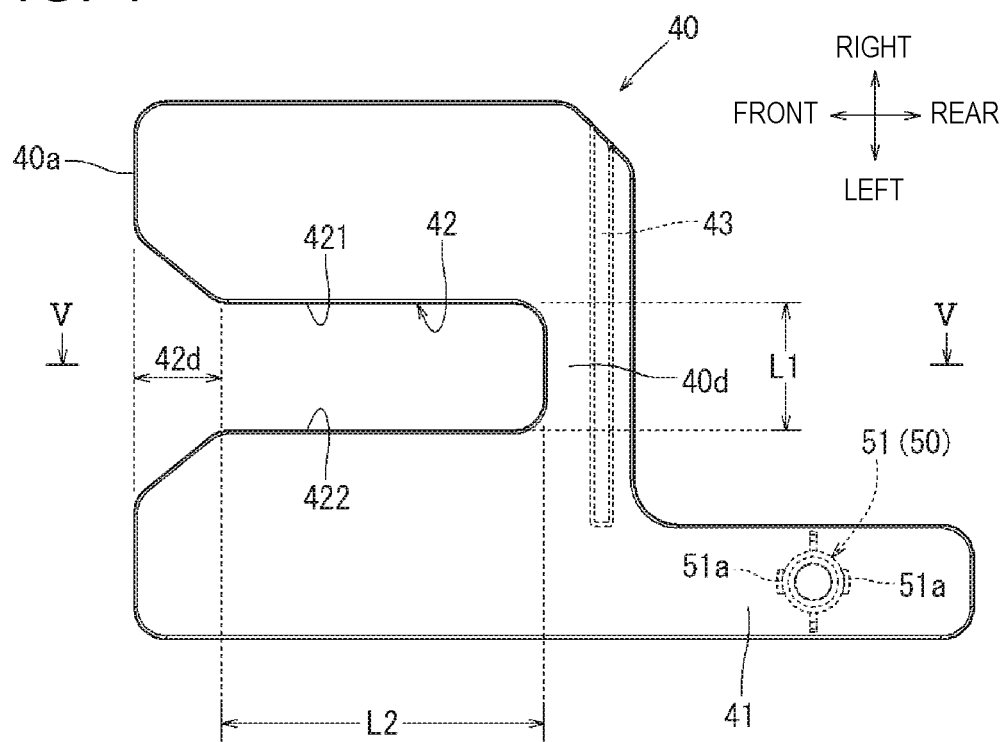
FIG. 4 is a top view of a support plate.

Each support plate 40 shown in FIG. 1 is a member for supporting the buckle main body 10a in each of the insertion holes 11, 12, and has substantially the same basic configuration (in FIG. 1, for convenience, a common reference numeral 40 is attached to each support plate). For example, when the support plate 40 on the left insertion hole 11 side shown in FIGS. 2 and 4 is described in detail as an example, the support plate 40 is separate from the holding plate 30, and includes a passage portion 42 and a portion of an engagement structure 50 to be described later. The support plate 40 is formed in a flat plate shape having a substantially rectangular shape in a top view, and a support side arm portion 41 extending rearward is integrally provided on the right rear edge side thereof. The outer dimension of the support plate 40 is larger than that of the lower opening OP2 of the left insertion hole 11, and has substantially the same outer shape as that of the holding plate 30 in the present embodiment. The material of the support plate 40 is not particularly limited as long as the material has appropriate rigidity, and the support plate is typically formed of a metal, a resin (including an elastomer) or the like, and is formed of a solid resin in the present embodiment. Further, the thickness dimension T1 of the support plate 40 shown in FIG. 5 is not particularly limited as long as the support plate 40 has an appropriate rigidity, but is typically set to have substantially the same thickness as the holding plate.

Figure 5:
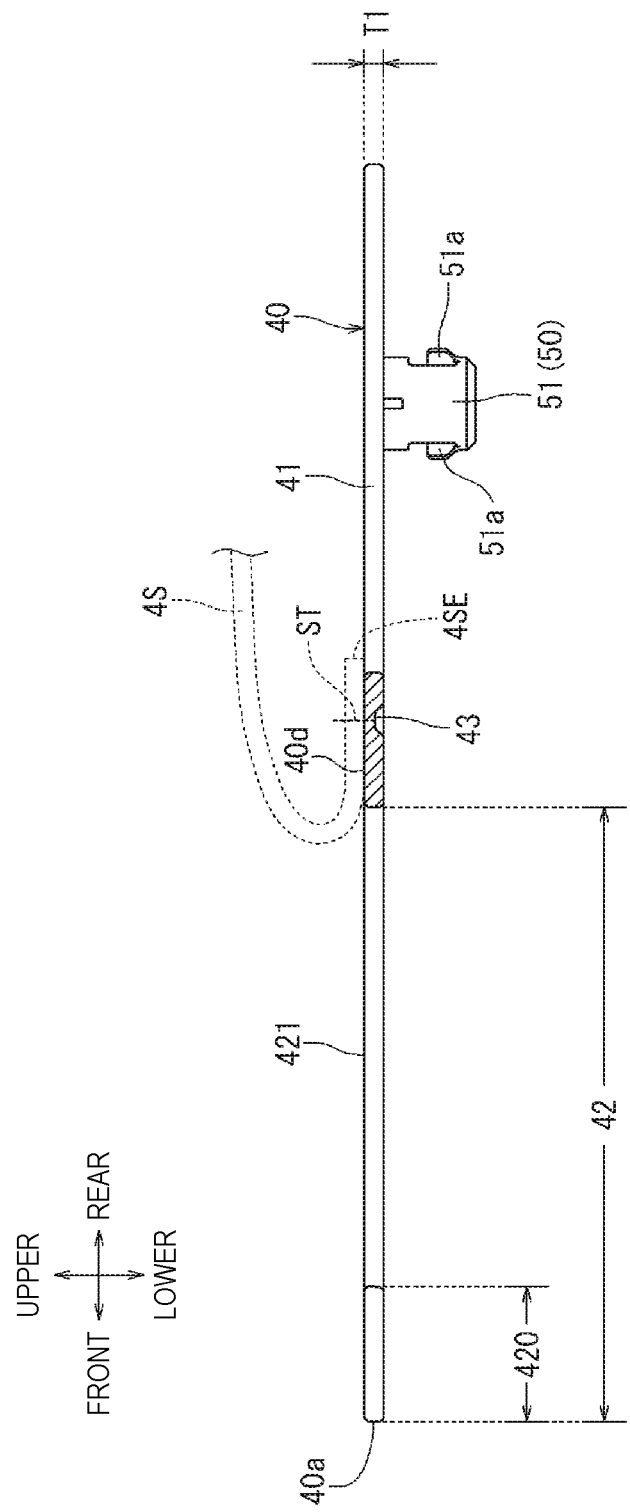
FIG. 5 is a sectional view of the support plate.

Referring to FIGS. 4 and 5, a rear edge portion 40d of the support plate 40 can be attached to a portion of the seat cover 4S disposed on the back side of the seat pad 4P, and is sewn and attached to a lower edge portion 4SE on the rear side of the seat cover 4S in the present embodiment. In the rear edge portion 40d of the support plate 40, a groove-shaped thin portion 43 extending in the left-right direction is formed, and in the thin portion 43, the thickness dimension of the support plate 40 is relatively small. Therefore, when the support plate 40 and a lower edge end portion 4SE of the seat cover 4S are sewn with stitches ST, the stitches ST can be smoothly formed along the thin portion 43, which contributes to improvement in workability during suturing. Referring to FIGS. 8 and 12, the support plate 40 is displaceable between the first state overlapping the holding plate 30 on the back surface side of the seat pad 4P and the second state not overlapping the holding plate 30. The support plate 40 in the second state shown in FIG. 8 can be disposed on the rear side of the left insertion hole 11 and the holding plate 30 together with the lower edge end portion 4SE of the seat cover 4S. Further, the support plate 40 in the first state shown in FIG. 12 is inserted and interposed between the seat pad 4P and the holding plate 30 as described later.

[Passage Portion]

Figure 10:
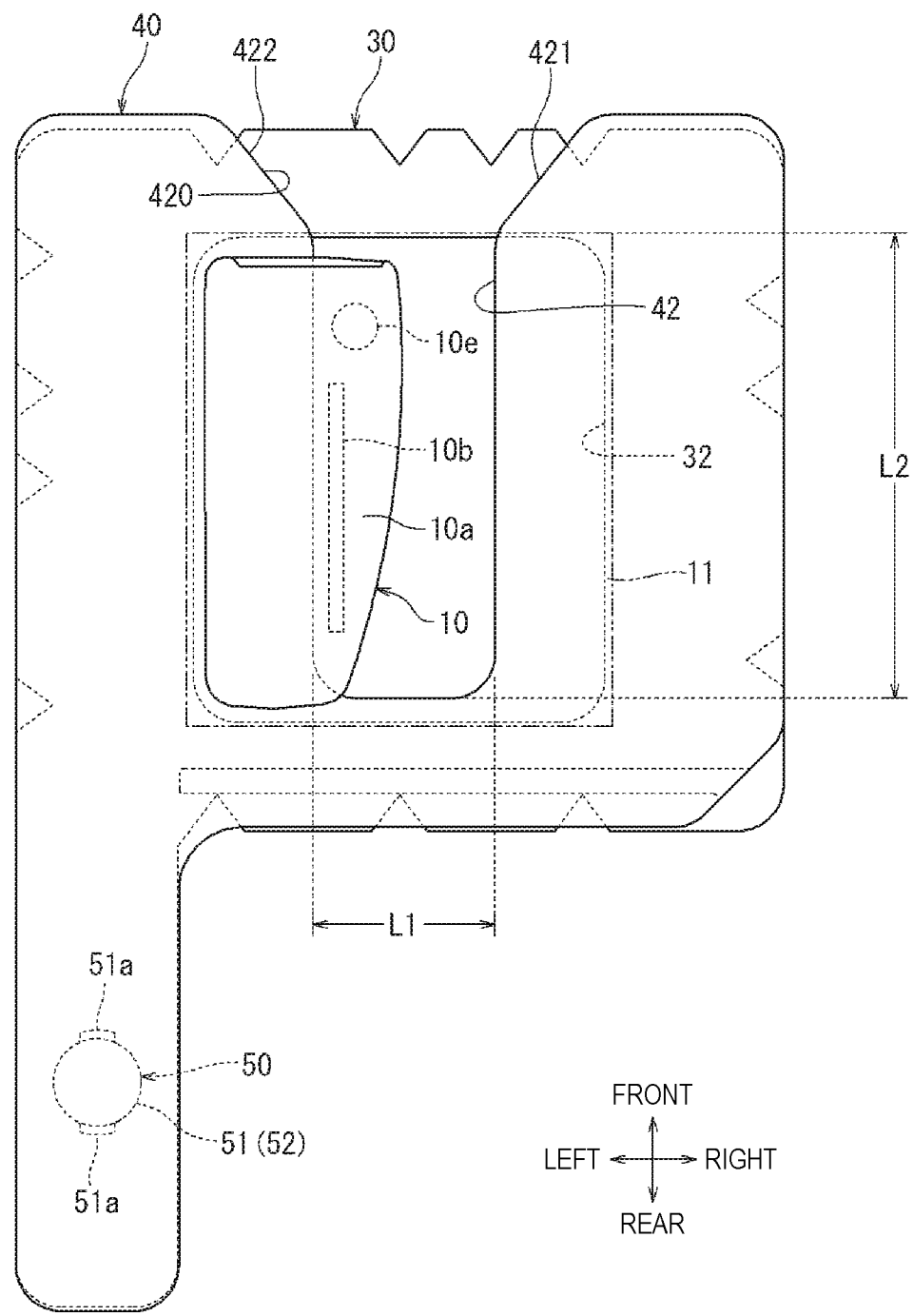
FIG. 10 is a top view showing a positional relationship between the holding plate, the support plate, and a buckle.

The passage portion 42 shown in FIGS. 2 and 4 is a notch-shaped groove portion passing through the support plate 40 in the thickness direction, and is disposed so as to overlap the insertion window portion 32 of the holding plate 30 in a first state to be described later. The passage portion 42 is formed linearly from the rear portion toward the front substantially at the center of the support plate 40 shown in FIG. 4 and includes an opening portion 420 that opens toward the front edge end 40a side of the support plate 40. A right edge end 421 and a left edge end 422 forming the inner edge of the passage portion 42 extend substantially linearly from the rear portion of the support plate 40 in a state with an appropriate interval therebetween in the left-right direction, but are inclined in the opening portion 420 in a direction gradually moving away from each other. Therefore, the opening portion 420 expands in a divergent shape toward the front, and has the largest opening dimension at the front edge 40a of the support plate 40. Referring to FIGS. 2 and 10, the opening dimension of the passage portion 42 is set to a dimension that allows passage of the coupling portion 10b (and the cable 10e), but does not allow passage of the buckle main body 10a in a state overlapping the insertion window portion 32. That is, referring to FIGS. 4 and 10, a left-right separate dimension L1 of each of the edge ends 421, 422 of the passage portion 42 is set to be smaller than the outer dimension of the lower surface of the buckle main body 10a in a portion excluding the opening portion 420. The left-right separate dimension L1 and a front-rear dimension L2 of each of the edge ends 421 and 422 of the passage portion 42 are set to be larger than the outer dimensions of the coupling portion 10b and the cable 10e in a portion excluding the opening portion 420.

[Engagement Structure]

Then, the support plate 40 in the first state is engaged with the holding plate 30 via the engagement structure 50 shown in FIGS. 3 and 4. The engagement structure 50 is formed by a convex portion 51 provided on the support plate 40 in FIG. 4 and a hole portion 52 provided in the holding plate 30 in FIG. 3. That is, referring to FIG. 3, the holding side arm portion 31 of the holding plate 30 is provided with the hole portion 52 passing through the holding plate 30 in the thickness direction. Referring to FIGS. 4 and 5, the support side arm portion 41 of the support plate 40 is provided with the convex portion 51 protruding from the lower surface thereof. The convex portion 51 has a substantially cylindrical shape, and a retaining piece 51a protruding from the outer surface thereof can be bent and deformed radially inward of the convex portion 51. The support plate 40 is a resin molded article formed by integrating the convex portion 51, and the support plate 40 and the convex portion 51 can be handled as one component.

[Holding End Portion of Covering Portion with Respect to Holding Plate]

Since the holding methods of the first covering portion 21 and the second covering portion 22 shown in FIG. 2 are substantially the same, the holding method of the first covering portion 21 will be described below as an example. The end portion (E) of the first covering portion 21 shown in FIG. 6 is sewn and held by the holding plate 30 through the covering member 30S. At this time, referring to FIGS. 6 and 8, the end portion (E) side of the front-side covering piece 21c is applied to the upper side of the front peripheral edge 30c of the holding plate 30 covered with the covering member 30S, and these are sewn with a first suture line SEW1 extending in the left-right direction. Similarly, the end portion (E) side of the rear-side covering piece 21d is applied to the upper side of the rear peripheral edge 30d of the holding plate 30, and these are sewn with a second suture line SEW2 extending in the left-right direction. The length dimension of each of the suture lines SEW1, SEW2 extending in the left-right direction is set to a dimension allowing insertion of a support plate to be described later.

In the present embodiment, referring to FIG. 8, when the holding plate 30 is disposed on the back side of the seat pad 4P, the height position of the holding plate 30 can be defined by an upper-lower length dimension of the front-side covering piece 21c and the rear-side covering piece 21d. For example, as the covering pieces 21c, 21d become longer, the height position of the holding plate 30 moves downward and is disposed at a position separated from the back surface of the seat pad 4P. Conversely, as the covering pieces 21c, 21d become shorter, the height position of the holding plate 30 moves upward and is disposed close to the back surface of the seat pad 4P. Therefore, in the present embodiment, when a state in which the holding plate 30 is applied to the back surface of the seat pad 4P is a reference height position H0, the holding plate 30 is adjusted so as to be disposed below the reference height position H0 by the thickness dimension of the support plate (refer to FIG. 5 for the thickness of the support plate). That is, the front-side covering piece 21c and the rear-side covering piece 21d, in addition to the portion covering the corresponding inner walls, are sewn and held on the holding plate 30 in the length dimension in a state in which the extra length portion EL2 corresponding to the thickness dimension of the support plate is provided. The reference height position H0 is the height position of the holding plate that is set such that the buckle main body 10a does not excessively protrude from the left insertion hole 11 to the seating side when the buckle main body 10a is disposed on the holding plate 30.

Referring to FIGS. 6 and 7, the end portion (E) side of the right-side covering piece 21a is applied to the upper surface of the right peripheral edge 30a of the holding plate 30, and is sewn with a third suture line SEW3 extending in the front-rear direction. Similarly, the end portion (E) side of the left-side covering piece 21b is applied to the upper surface of the left peripheral edge 30b of the holding plate 30, and is sewn with a fourth suture line SEW4 extending in the front-rear direction. In the present embodiment, the upper-lower lengths of the right-side covering piece 21a and the left-side covering piece 21b are adjusted so as to allow insertion of the support plate 40 to be described later. That is, the extra length portions EL1 larger than the other covering pieces 21c, 21d are provided on the right-side covering piece 21a and the left-side covering piece 21b so as to be sewn and held on the holding plate 30. Then, as shown in FIG. 11, when the support plate 40 is inserted, the extra length portions EL1 of the right-side covering piece 21a and the left-side covering piece 21b are inserted into the passage portion 42 of the support plate 40 while being bent toward the inside of the left insertion hole 11.

[Covering Work of Covering Portion with Respect to Insertion Hole]

Referring to FIG. 1, the first covering portion 21 is disposed in the left insertion hole 11, and the second covering portion 22 is disposed in the right insertion hole 12.

Here, since the disposing method of the first covering portion 21 and the second covering portion 22 is substantially the same, the disposing method of the first covering portion 21 will be described as an example. In the first covering portion 21, upper end edges of the covering pieces 21a to 21d are integrated with the seat cover 4S so as to form a portion of the seat cover 4S shown in FIG. 2. The holding plate 30 is sewn and attached to the end portion (E) side of the first covering portion 21. Therefore, when the seating surface of the seat pad 4P is covered by the seat cover 4S, the first covering portion 21 is pushed into the left insertion hole 11 together with the holding plate 30. As shown in FIG. 7, the right inner wall 11a of the left insertion hole 11 is covered by the right-side covering piece 21a, and the left inner wall 11b of the left insertion hole 11 is covered by the left-side covering piece 21b. Similarly, as shown in FIG. 8, the front inner wall 11c of the left insertion hole 11 is covered by the front-side covering piece 21c, and the rear inner wall 11d of the left insertion hole 11 is covered by the rear cover piece 21d.

Referring to FIGS. 7 and 8, the holding plate 30 is pulled out through the left insertion hole 11 from the seating surface of the seat pad 4P to the back side of the seat pad 4P and disposed on the back side of the seat pad 4P, and the peripheral edges 30a to 30d of the holding plate 30 are disposed so as to overlap the peripheral edge of the left insertion hole 11. In this way, the inner walls 11a to 11d are covered by the covering pieces 21a to 21d, respectively, and the lower end portions E of the covering pieces 21a, to 21d can be held by the holding plate 30 on the back side of the seat pad 4P, respectively. In the holding plate 30 in this state, the insertion window portion 32 is disposed in a state of overlapping the left insertion hole 11. Further, the right-side covering piece 21a and the left-side covering piece 21b shown in FIG. 7 are disposed in a state in which the large extra length portions EL1 (slack) are provided therein, and the support plate 40 to be described later can be inserted by these extra length portions EL1. Further, the height position of the holding plate 30 is defined by the extra length portions EL2 of the front-side covering piece 21c and the rear-side covering piece 21d shown in FIG. 8, and the holding plate is located below the reference height position H0 by the thickness of the support plate 40 with respect to the back surface of the seat pad 4P. In the second covering portion 22 shown in FIGS. 1 and 2, each inner wall of the right insertion hole 12 is covered with each of the other covering pieces 22a to 22d. The end portion of the second covering portion 22 is also held by another holding plate 30 on the back side of the seat pad 4P as well.

[Disposition Work of Buckle with Respect to Insertion Hold]

Figure 9:
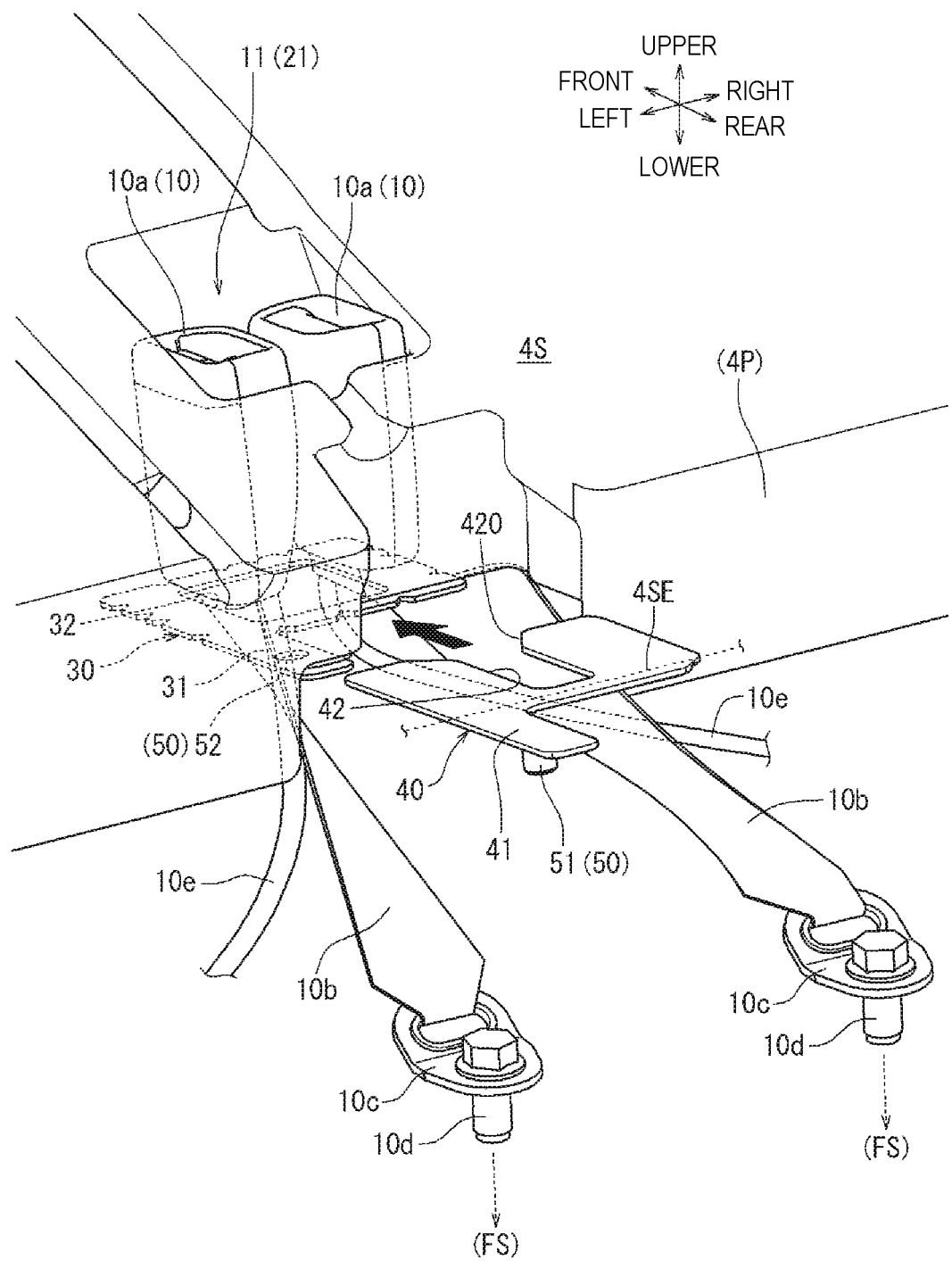
FIG. 9 is a perspective view of the seat cushion when the support plate is interposed.
Figure 13:
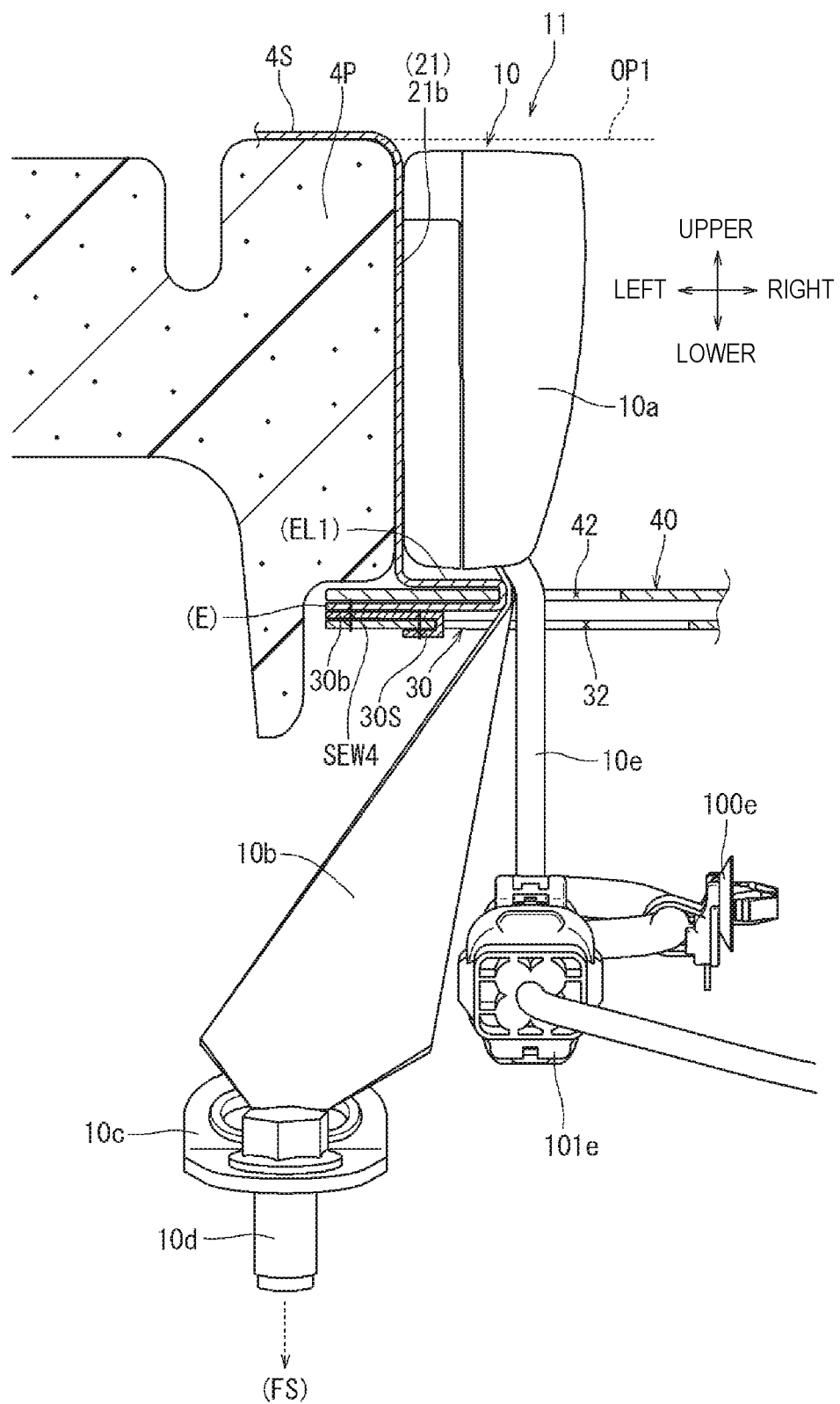
FIG. 13 is a cross-sectional view of the seat cushion showing the disposition of an attachment member.

Next, with reference to FIGS. 7 and 8, the disposition work of buckle will be described using one buckle 10 disposed in the left insertion hole 11 as an example. In the disposition work of the buckle 10, the buckle 10 is inserted from the seating side (upper side in each figure) or is inserted from the back side (lower side in each figure) of the left insertion hole 11 in consideration of the workability. For example, referring to FIGS. 2 and 9, the buckle 10 includes a bracket 10c, a fastener 10d, and a cable 10e as attachment members thereof. Considering that the attachment members 10c to 10e are disposed or routed on the back side of the seat pad 4P, it is desirable that the buckle main body 10a is inserted into the left insertion hole 11 from the back side of the seat pad 4P as shown in FIG. 7. Therefore, in the present embodiment, the bracket 10c provided at the distal end of the coupling portion 10b is fastened to the vehicle floor surface FS via the fastener 10d as shown in FIGS. 9 and 13, and the buckle main body 10a is inserted into the left insertion hole 11 from the back side of the seat pad 4P as shown in FIG. 7. With this type of configuration, it is necessary to consider such that the buckle main body 10a can be smoothly inserted into the left insertion hole 11, and after is not detached from the left insertion hole 11 after the disposition work.

Thus, as shown in FIG. 2, the vehicle seat 2 of the present embodiment includes the support plate 40 separate from the holding plate 30. The support plate 40 is displaceable between the first state overlapping the holding plate 30 on the back surface side of the seat pad 4P and the second state not overlapping the holding plate 30. The holding plate 30 includes the insertion window portion 32 that allows passage of the buckle 10 in a state overlapping the left insertion hole 11, and the support plate 40 includes the passage portion 42 that allows passage of the coupling portion 10b and the cable 10e, but does not allow passage of the buckle main body 10a in a state overlapping the insertion window portion 32. That is, in the present embodiment, when the support plate 40 is in the second state, as shown in FIG. 7, the relatively large insertion window portion 32 of the holding plate 30 is disposed on the back side of the seat pad 4P so as to overlap the lower opening OP2 of the left insertion hole 11. Therefore, after the fastening work, the buckle main body 10a can be inserted into the left insertion hole 11 through the insertion window portion 32, which contributes to ensuring workability at the time of disposing the buckle 10. In the present embodiment, as shown in FIGS. 11 and 12, by setting the support plate 40 in the first state, the buckle main body 10a can be supported so as not to be detached from the left insertion hole 11. Therefore, state displacement of the support plate 40 and a support mode of the buckle main body 10a will be specifically described below.

[State Displacement of Support Plate]

Here, the support plate 40 in the second state shown in FIG. 8 is attached to the lower edge end portion 4SE of the seat cover 4S and is disposed in the rear of the left insertion hole 11 (in FIG. 8, the support plate 40 is shown on the rear and the lower side due to space limitations). In the left insertion hole 11, the coupling portion 10b and the cable 10e are extended downward through the insertion window portion 32 of the holding plate 30 while the buckle main body 10a is disposed therein. In this state, as shown in FIGS. 9 and 10, the support plate 40 in the second state is inserted between the back surface of the seat pad 4P and the holding plate 30 from the rear, and the cable 10e and the coupling portion 10b are inserted into the passage portion 42 from the front-rear direction. At this time, by increasing the opening dimension of the passage portion 42 on the opening portion 420 side, the cable 10e and the coupling portion 10b can be smoothly inserted into the passage portion 42 from the opening portion 420.

Referring to FIGS. 7 and 11, the holding plate 30 positioned below the seat pad 4P holds the right-side covering piece 21a and the left-side covering piece 21b with appropriate extra length portions EL1. Therefore, during the insertion work, the support plate 40 is inserted while inserting the extra length portions EL1 of the right-side covering piece 21a and the left-side covering piece 21b so as to be sandwiched in the passage portion 42. As a result, the extra length portions EL1 of the right-side covering piece 21a and the left-side covering piece 21b are bent inward the left insertion hole 11, pass through the passage portion 42, and then bent outward. By continuing the insertion work, the upper side of the support plate 40 is covered with a good appearance by the extra length portions EL1 of the two covering pieces 21a, 21b, and the extra length portions EL1 are pulled toward the passage portion 42 side, so that there is almost no slack. Therefore, in a state where the right-side covering piece 21a and the left-side covering piece 21b are covered in which the portions from the corresponding inner walls 11a, 11b to the support plate 40 are covered with good appearance with almost no slack and good finishability.

[Positioning of Support Plate in Second State]

Referring to FIG. 12, by sufficiently inserting the support plate 40 between the seat pad 4P and the holding plate 30, the support plate 40 is in the second state overlapping with the holding plate 30. Whether or not the support plate 40 is sufficiently inserted can be determined based on whether or not the support plate overlaps the holding plate 30 without misalignment. Since the support plate 40 in the second state is sandwiched and held between the seat pad 4P and the holding plate 30, the support plate is positioned in the upper-lower direction. Next, two plates 30, 40 are engaged with each other via the engagement structure 50 to position the support plate 40 in the front-rear direction. That is, with reference to the support plate 40 in the first state, the convex portion 51 protruding downward from the support side arm portion 41 protruding rearward is pushed into the hole portion 52 of the holding side arm portion 31 of the holding plate 30 and inserted therethrough to engage with the periphery thereof, and is further retained by the retaining piece 51a. When the convex portion 51 and the hole portion 52 are engaged with each other in the upper-lower direction in this manner, the support plate 40 is positioned in the front-rear direction, and misalignment with the holding plate 30 is unlikely to occur. At this time, since the convex portion 51 is integrated with the support plate 40, it is not necessary to separately prepare and engage with the convex portion 51, and the locking work to the hole portion 52 can be simplified. Further, in the present embodiment, by moving the support plate 40 forward together with the lower edge end portion 4SE of the seat cover 4S, appropriate tension can be applied to the lower edge end portion 4SE of the seat cover 4S. By positioning the support plate 40 in the second state, it is possible to stably dispose the lower end edge portion 4SE of the seat cover 4S on the back side of the seat pad 4P with good finishability and appropriate tension.

[Disposition State of Buckle]

Referring to FIGS. 11 and 12, the coupling portion 10b and the cable 10e are inserted through the passage portion 42 of the support plate 40 in the first state, but the passage of the buckle main body 10a is not allowed. The opening portion 420 of the passage portion 42 is disposed on the front side of the left insertion portion 11 when the support plate 40 is sufficiently inserted. Therefore, the buckle main body 10a can be supported by the support plate 40, and detachment of the buckle main body 10a from the left insertion hole 11 can be prevented as much as possible. Further, since the cable 10e is disposed on the back side of the seat pad 4P through the insertion window portion 32 and the passage portion 42 (in a state in which the cable can be routed), the cable can be routed at an appropriate position on the back side of the seat pad 4P as shown in FIG. 13. In this way, in the present embodiment, the buckle main body 10a in the left insertion hole 11 can be supported with good performance by the support plate 40 while the buckle 10 can be inserted into the left insertion hole 11 through the holding plate 30.

In the present embodiment, as shown in FIG. 12, the support plate 40 is in a state of overlapping the upper side of the holding plate 30 to support the buckle main body 10a. In this type of configuration, it is assumed that the buckle main body 10a is raised to the bottom and protrudes excessively from the left insertion hole 11 to the seating side due to the overlap between the support plate 40 and the holding plate 30. Therefore, in the present embodiment, the height position of the holding plate 30 is defined by the front-side covering piece 21c and the rear-side covering piece 21d, and predetermined extra length portions EL2 are provided on both of the covering pieces 21c, 21d. That is, the front-side covering piece 21c and the rear-side covering piece 21d are held by the holding plate 30 in a state in which the upper-lower length dimensions thereof are provided with the extra length portions EL2 corresponding to the thickness length dimension of the support plate 40. Therefore, by disposing the support plate 40 on the upper side of the holding plate 30, the support plate 40 is disposed so as to fill the extra length portions EL2 of the front-side covering piece 21c and the rear-side covering piece 21d. In this way, in the present embodiment, since the support plate 40 is disposed at a position substantially coinciding with the reference height position H0 of the holding plate 30, a situation in which the buckle main body 10a in the left insertion hole 11 protrudes excessively toward the seating side can be avoided as much as possible.

As described above, in the present embodiment, by setting the support plate 40 in the first state, the buckle main body 10a can be supported so as not to be detached from the insertion holes 11, 12 while the coupling portion 10b is inserted into the relatively small passage portion 42. When the support plate 40 is in the second state, the buckle 10 (10a to 10e) can be inserted or pulled out with respect to the insertion holes 11, 12 through the relatively large insertion window portion 32 of the holding plate 30. Therefore, according to the present embodiment, the buckle main body 10a in each insertion hole 11, 12 can be supported with good performance while enabling smooth insertion and pull-out of the buckle 10 with respect to the insertion holes 11, 12.

Further, in the present embodiment, since the cable 10e, which is an attachment member of the buckle main body 10a, can be routed on the back side of the seat pad 4P through the insertion window portion 32 and the passage portion 42, workability at the time of disposing the buckle 10 can be ensured more reliably. Further, in the present embodiment, the covering portions 21, 22 and the support plate 40 can be disposed in appropriate positions by using the seat cover 4S. Further, in the present embodiment, the edge end portion (4SE) of the seat cover 4S can be stably disposed on the back side of the seat pad 4P via the support plate 40, which contributes to improvement in the finishability of the seat cover 4S. Further, in the present embodiment, the support plate 40 can be stably overlapped with the holding plate 30 by the engagement structure 50, which contributes to ensuring the support of the buckle main body 10a. Further, in the present embodiment, by integrating the convex portion 51 with the corresponding plate (40), it is possible to reduce the number of components of the vehicle seat 2 and to improve workability at the time of disposing each plate. Further, in the present embodiment, the support plate 40 in the first state is stably disposed in a state in which the support plate is sandwiched between the seat pad 4P and the holding plate 30. Further, in the present embodiment, by increasing the opening dimension of the passage portion 42 on the opening portion 420 side, the insertion work of the support plate 40 can be performed smoothly. In the present embodiment, since the slack is given to the specific covering pieces (21a, 21b) due to the extra length portions EL1, the insertion work of the support plate 40 can be performed more smoothly. In the present embodiment, the specific covering pieces (21c, 21d) are held by the holding plate 30 in a state in which the predetermined extra length portions EL2 are provided in consideration of interposing the support plate 40. Therefore, even when the support plate 40 is overlapped with the holding plate 30, a situation in which the buckle main body 10a in each insertion hole 11 or 12 protrudes excessively toward the seating side can be avoided as much as possible due to the thickness of the support plate 40.

The vehicle seat 2 of the present embodiment is not limited to the above-described embodiment, and various other embodiments may be adopted. In the present embodiment, although the configuration (shape, dimension, disposition number, disposition method, configuration member, or the like) of the buckle 10 or the like has been exemplified, it is not intended to limit the configuration of the buckle. For example, the buckle main body can have various shapes and dimensions as long as the buckle main body can be disposed in the insertion hole, and a plurality of or a single buckle main body can be disposed in the insertion hole by being vertically placed or laid horizontally. In addition to the belt-shaped member, the coupling portion may be formed of a plate shape or a rod-shaped member. The type of the attachment member can be selected according to the configuration of the buckle, and various attachment members such as electrical components such as cables and wiring and members for fastening and welding to the vehicle body can be assumed. The buckle can be inserted into the insertion hole from the seating side or the back side. For example, the buckle can be inserted into the insertion hole from the seating side, and only the attachment member can be pulled out from the back side of the insertion hole.

In the present embodiment, the configuration of the holding plate 30 and the support plate 40 is exemplified, but the configuration of each of the plates is not limited thereto. For example, the support plate and the holding plate may have the same shape in plan view (top view), and may have different shapes. In addition to the case where the support plate in the first state is overlapped with the upper side of the holding plate, the support plate can be overlapped with the lower side of the holding plate. The support plate can be attached to an appropriate position of the seat cover. For example, a skin piece for attaching the support plate can be attached to the back side of the seat cover. The support plate may be attached to a seat pad, a seat frame, or the holding plate via a skin piece for attachment, or may be used alone. The support plate and the skin piece can be fixedly attached to the seat cover or the like by a method such as sewing or the like, and can be detachably attached to the seat cover or the like via a hook-and-loop fastener or the like.

The opening dimension of the insertion window portion and the passage portion can be appropriately set according to the configuration of the buckle. For example, when the cable is not connected to the buckle main body, the passage portion can be set to an opening dimension that allows only the coupling portion to be inserted therethrough. The opening dimension of the opening portion of the passage portion is not necessarily increased. The engagement structure may have various configurations capable of engaging the holding plate and the support plate. For example, the engagement structure may be formed by the convex portion provided on the holding plate and the hole portion provided in the support plate. Further, as the engagement structure, a bolt shape or a clip shape engaging tool, hole portions provided in both plates, a clamp-shaped member for sandwiching both plates, and a structure for adhering (detachably attaching) both plates are adopted. In addition, the two plates can be engaged with each other in a slidable manner via a rail-shaped engagement structure.

In the present embodiment, the configuration of the covering portions 21, 22 is exemplified, but it is not intended to limit the configuration of the covering portions. For example, the configuration of the covering portions can be appropriately changed according to the configuration of the seat cover or the insertion hole. In addition, the covering portions can be formed by the seat cover itself, and the number of the covering pieces can also be changed as appropriate according to the configuration of the seat cover or the like. When the covering portions and the seat cover are formed separately, the upper end of the covering portions can be attached to the seating surface of the seat pad by a method such as sewing or adhesion. The extra length of each covering piece can be set in accordance with the insertion direction of the support plate. For example, when the support plate is inserted from the left-right direction, the front-side covering piece and the rear-side covering piece have relatively large extra length portion, and serve as the first covering piece and the second covering piece of the present invention. The right-side covering piece and the left-side covering piece have relatively small extra length portions, and serve as the third covering piece and the fourth covering piece of the present invention. In addition, as long as the support plate can be inserted into each of the covering pieces, covering pieces can be provided with extra length portions of the same length, and the extra length portions cannot be provided as long as the covering pieces expand and contract appropriately.

Further, although the configuration of the vehicle seat 2 is exemplified in the present embodiment, the configuration of the vehicle seat can be appropriately changed, and the configuration of the present invention can be applied to a vehicle seat for a plurality of persons or a single person. The configurations of the seat belt, the buckle, and the insertion hole can be appropriately changed according to the seat configuration, and the configuration of the seat pad and the seat cover can be appropriately changed as necessary. The configuration of the present embodiment can be applied to all vehicle seats for vehicles, aircraft, trains, ships, or the like.

What is claimed is:

1. A vehicle seat, comprising:
    a seat pad that is capable of elastically supporting an occupant;
    an insertion hole that passes through the seat pad in a thickness direction of the seat pad;
    a covering portion that is planar and covers an inner wall of the insertion hole;
    a holding plate that holds a distal end of the covering portion at the back side of the seat pad;
    a buckle for a seat belt; and
    a support plate that is separate from the holding plate, wherein the buckle includes:
        a buckle main body to be disposed in the insertion hole;
        a coupling portion integrated with the buckle main body and having an outer dimension smaller than that of the buckle main body; and
        an attachment member provided on the buckle main body or the coupling portion,
    the support plate is displaceable between a first state in which the support plate overlaps with the holding plate at a back side of the seat pad and a second state in which the support plate does not overlap with the holding plate,
    the holding plate includes an insertion window portion that allows insertion of the buckle in a state where the holding plate overlaps with the insertion hole, and
    the support plate includes a passage portion that allows the coupling portion to pass through the passage portion but does not allow the buckle main body to pass through the passage portion in a state where the support plate overlaps with the insertion window portion.

2. The vehicle seat according to claim 1, wherein
the attachment member includes a cord-shaped cable, and
the cable is capable of being routed at the back side of the seat pad through the insertion window portion and the passage portion.

3. The vehicle seat according to claim 1, further comprising a seat cover that covers an outer surface of the seat pad,
wherein the covering portion is integrated with a first portion of the seat cover which covers a seating surface of the seat pad, and
the support plate is attached to a second portion of the seat cover which is disposed on a back surface side of the seat pad.

4. The vehicle seat according to claim 3, wherein the support plate is attached to an edge end portion of the seat cover.

5. The vehicle seat according to claim 1, further comprising an engaging structure that engages the support plate in the first state with the holding plate,
wherein the engagement structure is formed by a convex portion provided on one of the holding plate and the support plate, and a hole portion provided on the other of the holding plate and the support plate and into which the convex portion is inserted and engaged.

6. The vehicle seat according to claim 5, wherein
one of the holding plate and the support plate is a resin molded article integrally provided with the convex portion.

7. The vehicle seat according to claim 1, wherein
the support plate in the first state is inserted and interposed between the seat pad and the holding plate.

8. The vehicle seat according to claim 7, wherein
the passage portion is a notch-shaped groove portion provided in the support plate and includes an opening portion at an edge end side of the support plate in an insertion direction of the support plate, and an opening dimension of the opening portion gradually increases toward an edge end of the support plate.

9. The vehicle seat according to claim 7, wherein
the covering portion includes a first covering piece and a second covering piece disposed to face each other in a direction orthogonal to the insertion direction of the support plate,
the first covering piece and the second covering piece are held by the holding plate in a state in which extra length portions are provided so as to allow insertion of the support plate, in addition to portions covering the corresponding inner walls.

10. The vehicle seat according to claim 7, wherein
the covering portion includes a third covering piece and a fourth covering piece disposed to face each other in the insertion direction of the support plate,
the third covering piece and the fourth covering piece are held by the holding plate in a state in which extra length portions corresponding to a thickness dimension of the support plate are provided, in addition to a portions covering the corresponding inner walls.

11. The vehicle seat according to claim 1, wherein
the covering portion includes:

a first covering piece and a second covering piece disposed to face each other in a direction orthogonal to the insertion direction of the support plate, and
a third covering piece and a fourth covering piece disposed to face each other in the insertion direction of the support plate, and in a range between an upper end of the insertion hole and the holding plate, a length of the first covering piece and the second covering piece is longer than a length of the third covering piece and the fourth covering piece.

* * * * *